United States Patent
He et al.

(10) Patent No.: US 11,228,926 B2
(45) Date of Patent: Jan. 18, 2022

(54) ENHANCEMENT OF QUALITY OF EXPERIENCE MEASUREMENT COLLECTION REPORTING

(71) Applicant: NOKIA TECHNOLOGIES OY, Espoo (FI)

(72) Inventors: Jing He, Beijing (CN); Malgorzata Tomala, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/617,393

(22) PCT Filed: Jul. 10, 2017

(86) PCT No.: PCT/CN2017/092361
§ 371 (c)(1),
(2) Date: Nov. 26, 2019

(87) PCT Pub. No.: WO2019/010606
PCT Pub. Date: Jan. 17, 2019

(65) Prior Publication Data
US 2020/0162949 A1 May 21, 2020

(51) Int. Cl.
*H04W 24/08* (2009.01)
*H04L 12/24* (2006.01)

(52) U.S. Cl.
CPC ......... *H04W 24/08* (2013.01); *H04L 41/0896* (2013.01); *H04L 41/5032* (2013.01)

(58) Field of Classification Search
CPC . H04W 24/08; H04L 41/0896; H04L 41/5032
See application file for complete search history.

(56) References Cited

U.S. PATENT DOCUMENTS

2012/0106386 A1* 5/2012 Johansson ............. H04W 24/08
370/252
2013/0286868 A1 10/2013 Oyman et al.
(Continued)

FOREIGN PATENT DOCUMENTS

| CN | 102223657 A | 10/2011 |
| CN | 102355692 A | 2/2012 |

(Continued)

OTHER PUBLICATIONS

International Search Report and Written Opinion for International Application No. PCT/CN2017/092361, dated Jan. 10, 2018, 8 pages.
(Continued)

*Primary Examiner* — Duc C Ho
(74) *Attorney, Agent, or Firm* — Brake Hughes Bellermann LLP

(57) ABSTRACT

There are provided measures for enhancement of quality of experience measurement collection reporting. Such measures exemplarily comprise receiving service quality reporting configuration information, generating service quality reporting resource limitation parameters, forwarding the service quality reporting configuration information, and deploying the service quality reporting resource limitation parameters. In some implementations, deploying includes transmitting the service quality reporting resource limitations parameters.

22 Claims, 10 Drawing Sheets

(56) References Cited

U.S. PATENT DOCUMENTS

| | | | | |
|---|---|---|---|---|
| 2014/0043973 | A1* | 2/2014 | Groenendijk | H04L 41/0896 |
| | | | | 370/230 |
| 2014/0087716 | A1* | 3/2014 | Vaderna | H04W 24/08 |
| | | | | 455/422.1 |
| 2016/0373324 | A1* | 12/2016 | Gholmieh | H04L 65/4084 |
| 2018/0124617 | A1* | 5/2018 | Nagasaka | H04W 16/18 |
| 2020/0413275 | A1* | 12/2020 | Eklof | H04W 24/10 |

FOREIGN PATENT DOCUMENTS

| | | |
|---|---|---|
| CN | 102647741 A | 8/2012 |
| CN | 102752789 A | 10/2012 |
| WO | 2016169008 A1 | 10/2016 |
| WO | 2017004810 A1 | 1/2017 |

OTHER PUBLICATIONS

European Search Report for Application No. 17917597.1, dated Jan. 26, 2021, 11 pages.
3GPP TSG-RAN WG2 Meeting #89bis, R2-151611; "MTSI QoE Metrics and MDT", Agenda Item: 7.8 Source: Qualcomm Incorporated; Bratislava, Slovakia; Apr. 20-24, 2015; 3 pages.

* cited by examiner

ENHANCEMENT OF QUALITY OF EXPERIENCE MEASUREMENT COLLECTION REPORTING

CROSS-REFERENCE TO RELATED APPLICATIONS

This application is a national stage entry of International Application No. PCT/CN2017/092361, filed Jul. 10, 2017, entitled "ENHANCEMENT OF QUALITY OF EXPERIENCE MEASUREMENT COLLECTION REPORTING" which is hereby incorporated by reference in its entirety.

FIELD

The present invention relates to quality of experience measurement collection and reporting for streaming and other services. More specifically, the present invention exemplarily relates to measures (including methods, apparatuses and computer program products) for realizing enhancement of quality of experience measurement collection reporting.

BACKGROUND

Mobile data transmission and data services are constantly making progress. A growing consumer demand for mobile video services is one of the key drivers of the evolution of new wireless multimedia solutions towards delivering enhanced quality of experience (QoE). Namely, in view of that various video streaming applications and interactive video applications like videoconferencing are to be supported, wireless networks need to be optimized for the delivery of a range of video content and video-based applications.

In particular, video communication over mobile broadband networks is challenging due to limitations in bandwidth and difficulties in maintaining high reliability, quality, and latency demands imposed by rich multimedia applications. These challenges are to be met in order to deliver higher user capacity to serve more users and also deliver enhanced QoE for a rich set of video applications.

For the user QoE to be accurately assessed, evaluation methodologies and performance metrics are necessary, while respective information are to be transmitted from a communication endpoint near the experience to the network. Quality of experience measurement collection (QMC) and reporting ensures obtaining these QoE related information. QoE metrics and QoE reporting configuration parameters and QoE reporting procedures are known to be used for quality estimation.

FIG. 7 shows a schematic diagram of a system environment with signaling variants and in particular illustrates minimization of drive tests (MDT) enhancement for supporting QoE reporting. The main concept of MDT is to exploit commercial user equipments (UE)—their measurement capabilities and geographically spread nature—for collecting radio measurements, instead of sending engineers directly to a concerning area and obtaining radio measurements in a hand-operated manner to collect network quality information.

It is further known that a QMC report may be triggered in a UE application layer (e.g. a dynamic adaptive streaming over HTTP (DASH) client), while the content/format is transparent for UE Access Stratum (AS) layer. Different from other MDT measurement, QoE measurement report triggering mechanism (event and periodic report triggering) are controlled by the DASH client but are not generated by a radio access network (RAN) entity. According to a known approach, in downlink a container in a radio resource control (RRC) measurement control message is to transfer the QoE metrics configuration from evolved NodeB (eNB) to UE and in uplink a container in an RRC measurement report message is to transfer QoE metrics reporting from UE to eNB. The container of QoE metrics configuration will be received from core network (CN) in a signaling based QMC initiation way or from operation and maintenance (O&M) in a management based QMC initiation way.

It is further known to use a data radio bearer (DRB) to transfer QoE metrics reporting data and/or QoE metrics configuration instead of using the above-mentioned container.

Hence, the content/format of QoE metrics and QoE reporting configuration parameters is transparent for RAN network entity (eNB, gNB, Radio Network Controller (RNC)). QoE measurement report triggering mechanism (event and periodic report triggering) is controlled by the DASH Client, not by the RAN entity. The RAN network entity is just used as a medium to pass information to the UE. The RAN entity does not know the reporting data's frequency and exact data size from UE application layer.

The rough report data size that can match a single RRC message is maximum 8188 bytes. A data compress function may be supported in UE application layer.

An issue with the above outlined known approach is that the unaware RAN entity cannot apply appropriate control of the transmissions in relation to QMC.

However, frequent transmission in uplink for such big data may/must occupy lots of Uu interface resources (Uu interface: air interface of UE) and then strongly impact other ongoing services and even critical services. Such impacting does not only relate to different services of the UE itself, but also to different UEs' services in one cell. In this regard, the UE behavior is out of control of the radio network side or undefined, such that the UE's reporting behaviour may bring trouble to the network in uplink. The respective network entity is in addition not aware of how to apply charging policies and is not able to differentiate content of the triggered session.

The above introduced approach to include a container for the QoE configuration in RRC message from eNB to UE and to include a container for the QoE report in RRC message from UE to eNB is a rather simple approach.

A more complicated approach is to include the QoE configuration with each QoE metric and reporting criteria in RRC message from eNB to UE by the eNB decoding the configuration container received from core network (CN) or from operation and maintenance (O&M) to produce the legacy AS layer measurement configuration, and to include the QoE report in RRC message from UE AS to eNB by the UE AS decoding the reporting container received from UE application layer/NAS layer to produce the legacy AS layer measurement report.

While with such approach the above-mentioned issue that the RAN network cannot suppress the UE's reporting behavior may be addressed, it is too complicated to be implemented in eNB and UE separately per each QoE metric. Namely, in case the eNB can interpret any QoE metrics and set RAN controlled criteria when received relative information from CN or O&M, the measurement report is fully controlled in RAN network entity by using a legacy measurement management way.

However, as mentioned, the approach is too complicated to be implemented in eNB and UE as it asks eNB and UE AS to interpret application layer defined data content/format and translate to for radio specific measurement and report. It increases work load of eNB and UE AS too much and is not attractive for vendors to support.

Hence, the problem still arises that the RAN network entity needs to be able to suppress UE's reporting behavior bringing trouble to the network in uplink with manageable effort.

Hence, there is a need to provide for enhancement of quality of experience measurement collection reporting.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising receiving service quality reporting configuration information, generating service quality reporting resource limitation parameters, forwarding said service quality reporting configuration information, and deploying said service quality reporting resource limitation parameters.

According to an exemplary aspect of the present invention, there is provided a method comprising receiving service quality reporting configuration information, generating a service quality report based on said service quality reporting configuration information, deciding whether to transmit said service quality report dependent on service quality reporting resource limitation parameters, and transmitting said service quality report based on a result of said deciding.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform receiving service quality reporting configuration information, generating service quality reporting resource limitation parameters, forwarding said service quality reporting configuration information, and deploying said service quality reporting resource limitation parameters.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform receiving service quality reporting configuration information, generating a service quality report based on said service quality reporting configuration information, deciding whether to transmit said service quality report dependent on service quality reporting resource limitation parameters, and transmitting said service quality report based on a result of said deciding.

According to an exemplary aspect of the present invention, there is provided an apparatus comprising receiving circuitry configured to receive service quality reporting configuration information, generating circuitry configured to generate service quality reporting resource limitation parameters, forwarding circuitry configured to forward said service quality reporting configuration information, and deploying circuitry configured to deploy said service quality reporting resource limitation parameters.

According to an exemplary aspect of the present invention, there is provided an apparatus comprising receiving circuitry configured to receive service quality reporting configuration information, generating circuitry configured to generate a service quality report based on said service quality reporting configuration information, deciding circuitry configured to decide whether to transmit said service quality report dependent on service quality reporting resource limitation parameters, and transmitting circuitry configured to transmit said service quality report based on a result of said deciding.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient suppression of UE's measurement collection reporting to thereby solve at least part of the problems and drawbacks identified in relation to the prior art.

By way of exemplary embodiments of the present invention, there is provided enhancement of quality of experience measurement collection reporting. More specifically, by way of exemplary embodiments of the present invention, there are provided measures and mechanisms for realizing enhancement of quality of experience measurement collection reporting.

Thus, improvement is achieved by methods, apparatuses and computer program products enabling/realizing enhancement of quality of experience measurement collection reporting.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
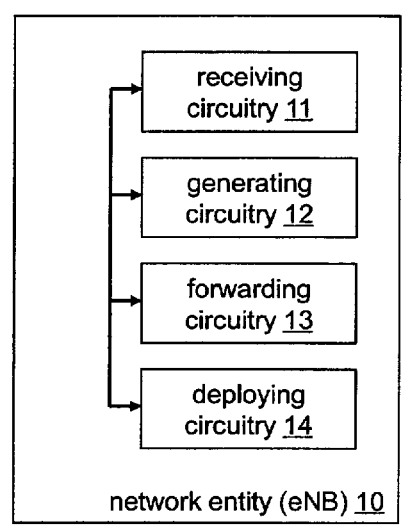
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) enhancement of quality of experience measurement collection reporting.

In principle, a RAN network entity controlled QMC reporting solution is provided.

Namely, according to exemplary embodiments of the present invention, a RAN network entity (eNB, gNB, RNC) may apply (own) QoE measurement collection reporting policies in addition to O&M. The node may control QMC report with frequency- and UE-based granularity. The node may detect a UE's QME reporting frequency. In case the reporting brings severe impact to the whole cell's uplink capacity or other ongoing services running in the certain UE, the RAN network entity may command the UE to stop reporting. The UE reporting may be recovered by commands from the RAN network entity or an expired timer.

Further, according to exemplary embodiments of the present invention, the RAN network entity may configure some control parameters to the UE in addition to the O&M originated configuration. The RAN entity may overwrite or suspend part of the O&M initiated configuration temporarily to apply own policies. The UE may detect the QMC reporting frequency by itself and may perform QMC reporting stop and recovery according to RAN network entity configured control parameter. The parameter may correspond to the most interfering reporting content (e.g. be based on report content or QoE metric or metric attributes).

In case one certain UE has one more services to be asked for QMC reporting, RAN network entity may control the QMC report of one specific service of the UE or may control the QMC report of all services of the UE.

Exemplary embodiments of the present invention are described in more detail below.

Figure 5:
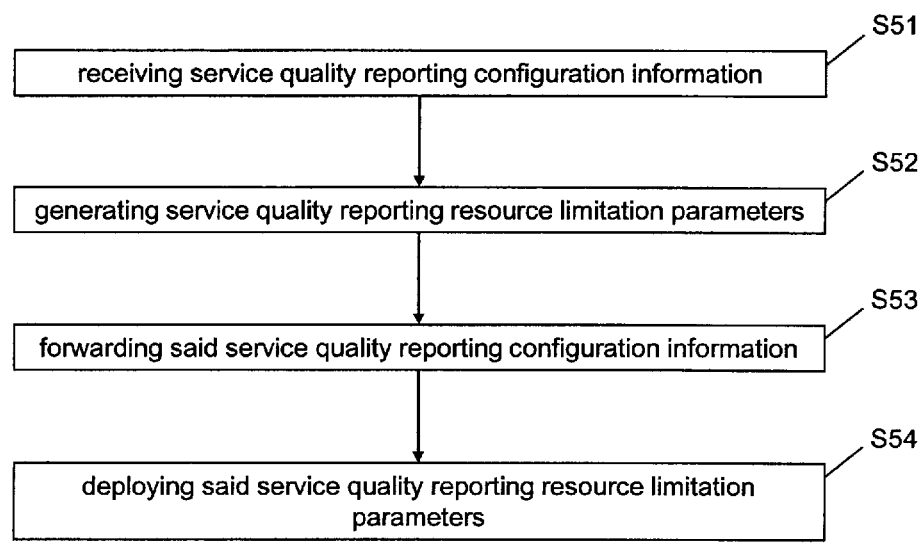
FIG. 5 is a schematic diagram of a procedure according to exemplary embodiments of the present invention.

FIG. 1 is a block diagram illustrating an apparatus according to exemplary embodiments of the present invention. The apparatus may be a network entity (e.g. access node) 10 such as a base station (e.g. eNB) comprising receiving circuitry 11, generating circuitry 12, forwarding circuitry 13, and deploying circuitry 14. The receiving circuitry 11 receives service quality reporting configuration information. The generating circuitry 12 generates service quality reporting resource limitation parameters (e.g. based on suspension function of part of the received configuration information). The forwarding circuitry 13 forwards said service quality reporting configuration information. The deploying circuitry 14 deploys said service quality reporting resource limitation parameters. FIG. 5 is a schematic diagram of a procedure according to exemplary embodiments of the present invention. The apparatus according to FIG. 1 may perform the method of FIG. 5 but is not limited to this method. The method of FIG. 5 may be performed by the apparatus of FIG. 1 but is not limited to being performed by this apparatus.

As shown in FIG. 5, a procedure according to exemplary embodiments of the present invention comprises an operation of receiving (S51) service quality reporting configuration information, an operation of generating (S52) service quality reporting resource limitation parameters, an operation of forwarding (S53) said service quality reporting configuration information, and an operation of deploying (S54) said service quality reporting resource limitation parameters.

Figure 2:
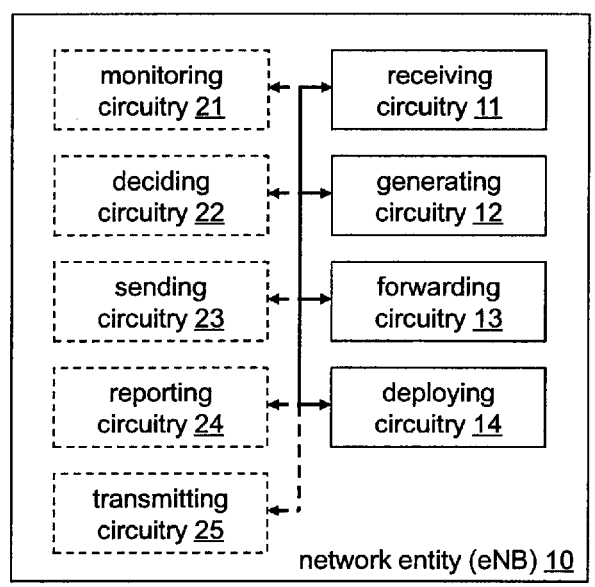
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise monitoring circuitry 21, deciding circuitry 22, sending circuitry 23, reporting circuitry 24, and/or transmitting circuitry 25.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 5, exemplary details of the deploying operation (S54) are given, which are inherently independent from each other as such.

Such exemplary deploying operation (S54) according to exemplary embodiments of the present invention may comprise an operation of monitoring resources utilized for service quality reporting, and an operation of deciding whether to limit said resources utilized for service quality reporting based on said service quality reporting resource limitation parameters.

According to a variation of the procedure shown in FIG. 5, exemplary additional operations are given, which are inherently independent from each other as such. According to such variation, an exemplary method according to exemplary embodiments of the present invention may comprise an operation of sending, if said resources utilized for service quality reporting are to be limited as a result of said deciding, a suspend command to suspend service quality reporting.

According to a variation of the procedure shown in FIG. 5, exemplary additional operations are given, which are inherently independent from each other as such. According to such variation, an exemplary method according to exemplary embodiments of the present invention may comprise an operation of reporting suspension of said service quality reporting.

According to still further exemplary embodiments of the present invention, said service quality reporting resource limitation parameters comprise a suspension expiration timer, and said suspend command comprises said suspension expiration timer.

According to a variation of the procedure shown in FIG. 5, exemplary additional operations are given, which are inherently independent from each other as such. According to such variation, an exemplary method according to exemplary embodiments of the present invention may comprise an operation of sending, if said resources utilized for service quality reporting are not to be limited as a result of said deciding, a recovery command to recover (i.e. to continue/revive) service quality reporting.

According to a variation of the procedure shown in FIG. 5, exemplary additional operations are given, which are inherently independent from each other as such. According to such variation, an exemplary method according to exemplary embodiments of the present invention may comprise an operation of reporting recovery (i.e. continuation/revival) of suspension of said service quality reporting.

According to still further exemplary embodiments of the present invention, said service quality reporting resource limitation parameters comprise a report number threshold, a monitoring time, and a cell load threshold, and, if, during said monitoring time, a service quality reporting number exceeds said report number threshold and a cell load exceeds said cell load threshold, said resources utilized for service quality reporting are to be limited as a result of said deciding.

According to still further exemplary embodiments of the present invention, said service quality reporting resource limitation parameters comprise a cell load recovery threshold, and, if, said cell load is lower than said cell load recovery threshold, said resources utilized for service quality reporting are not to be limited as a result of said deciding.

According to still further exemplary embodiments of the present invention, said service quality reporting resource limitation parameters comprise a report number threshold, a monitoring time, and a communication endpoint load threshold, and, if, during said monitoring time, a service quality reporting number exceeds said report number threshold and a communication endpoint load exceeds said communication endpoint load threshold, said resources utilized for service quality reporting are to be limited as a result of said deciding.

According to still further exemplary embodiments of the present invention, said service quality reporting resource limitation parameters comprise a communication endpoint load recovery threshold, and, if, said communication endpoint load is lower than said communication endpoint load recovery threshold, said resources utilized for service quality reporting are not to be limited as a result of said deciding.

In other words, according to exemplary embodiments of the present invention, the RAN network entity may control the QMC reporting frequency.

Namely, according to these exemplary embodiments of the present invention, the following parameters (all or partial) may be set in RAN network entity for QMC reporting frequency detection: a report times threshold (e.g. report number threshold) X (number); a duration (e.g. monitoring time) Y (time); a suspending timer (e.g. suspension expiration timer) Z (time); a cell load threshold W1 and W2 (Percentage); the UE's load threshold (e.g. communication endpoint load threshold) U1 and U2 (Percentage), which may be the bit rate ratio of QMC reporting and all other ongoing services in the certain UE.

Further, according to these exemplary embodiments, during time Y, if a number of received QMC report of one UE is above X and current cell load is above W1, the RAN network entity may command the UE to suspend the QMC report.

Alternatively, or in addition, according to these exemplary embodiments, the RAN network entity may command the UE to suspend particular QMC report with particular attributes.

Further, according to these exemplary embodiments, during time Y, if a number of received QMC report of one UE is above X and a reported UE load is above U1, the RAN network entity may command the UE to suspend the QMC report.

Further, according to these exemplary embodiments, after the suspend command is received, if the suspending timer Z is configured, the UE may stop the QMC reporting as soon as Z is expired. All reporting data produced during the suspending timer Z may be discarded by UE or may be logged in the UE for subsequent transmission.

Further, according to these exemplary embodiments, if the cell load situation is improved, e.g. current cell load is lower than W2, the RAN network entity may command the UE to recover the QMC report.

Further, according to these exemplary embodiments, if the UE's other service load situation is improved, e.g. the reported UE load is lower than U2, the RAN network entity may command the UE to recover the QMC report.

According to a variation of the procedure shown in FIG. 5, exemplary details of the deploying operation (S54) are given, which are inherently independent from each other as such.

Such exemplary deploying operation (S54) according to exemplary embodiments of the present invention may comprise an operation of transmitting said service quality reporting resource limitation parameters.

According to still further exemplary embodiments of the present invention, said service quality reporting resource limitation parameters comprise a report number threshold, a monitoring time, and a suspension expiration timer.

According to a variation of the procedure shown in FIG. 5, exemplary additional operations are given, which are inherently independent from each other as such. According to such variation, an exemplary method according to exemplary embodiments of the present invention may comprise an operation of receiving a service quality report, and an operation of forwarding said service quality report.

In other words, according to exemplary embodiments of the present invention, the RAN network entity may configure the UE and the UE may self-control (based on the configuration by the RAN network) the QMC reporting frequency.

Namely, according to these exemplary embodiments of the present invention, the following parameters (all or partial) may be configured by the RAN network entity to the UE: a report threshold (e.g. report number threshold) X (number); a duration (e.g. monitoring time) Y (time); a suspend timer (e.g. suspension expiration timer) Z (time).

Further, according to these exemplary embodiments, during this time Y, if the UE detects the number of QMC reporting (times) more than X, the UE may stop the QMC reporting up to expiration of the suspending timer Z.

Figure 3:
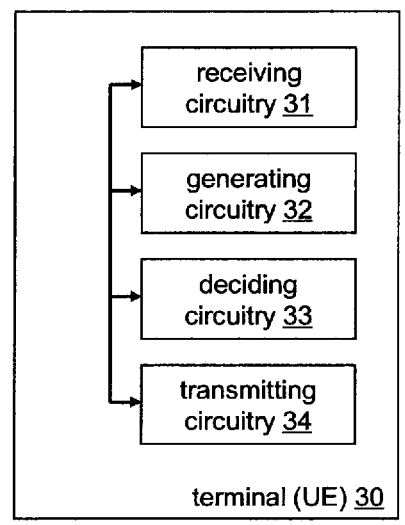
FIG. 3 is a block diagram illustrating an apparatus according to exemplary embodiments of the present invention.
Figure 6:
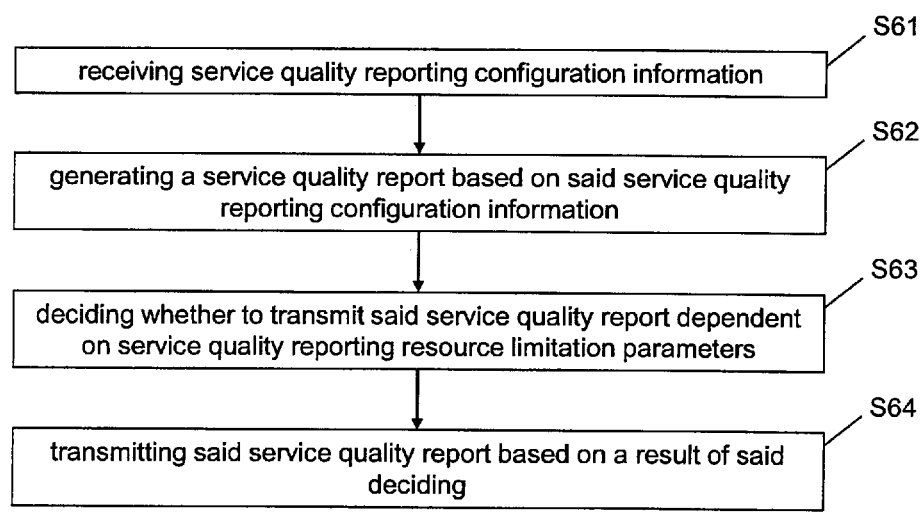
FIG. 6 is a schematic diagram of a procedure according to exemplary embodiments of the present invention.
Figure 7:
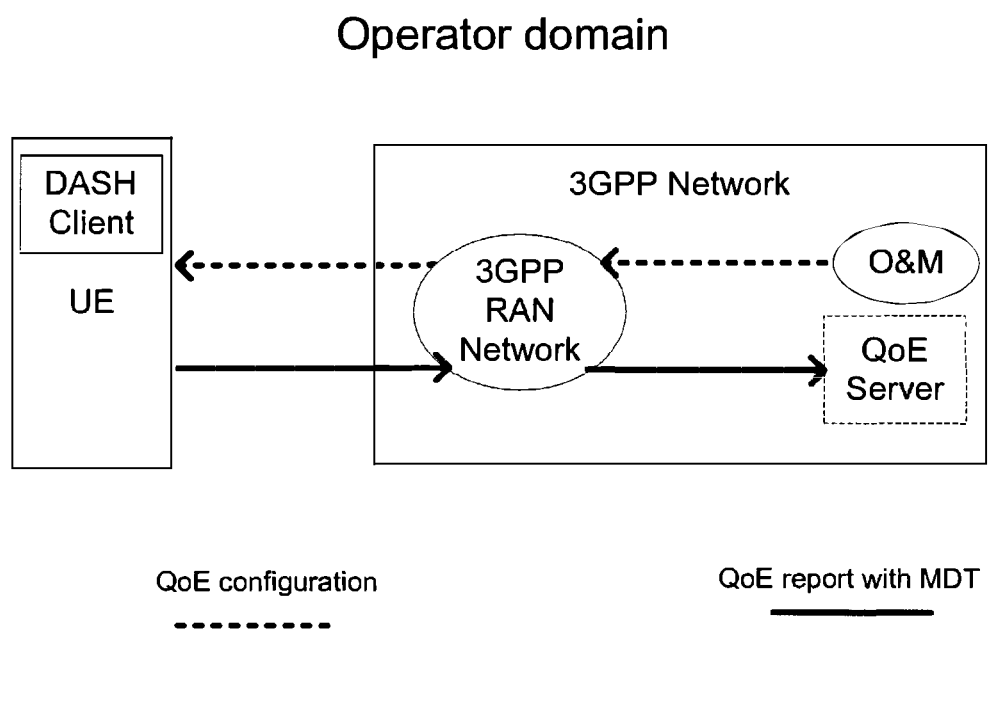
FIG. 7 shows a schematic diagram of a system environment with signaling variants.

FIG. 3 is a block diagram illustrating an apparatus according to exemplary embodiments of the present invention. The apparatus may be a communication endpoint 30 such as a terminal (e.g. UE) comprising receiving circuitry 31, generating circuitry 32, deciding circuitry 33, and transmitting circuitry 34. The receiving circuitry 31 receives service quality reporting configuration information. The generating circuitry 32 generates a service quality report based on said service quality reporting configuration information. The deciding circuitry 33 decides whether to transmit said service quality report dependent on service quality reporting resource limitation parameters. The transmitting circuitry 34 transmits said service quality report based on a (deciding) result of said deciding circuitry 33. FIG. 6 is a schematic diagram of a procedure according to exemplary embodiments of the present invention. The apparatus according to FIG. 3 may perform the method of FIG. 6 but is not limited to this method. The method of FIG. 6 may be performed by the apparatus of FIG. 3 but is not limited to being performed by this apparatus.

As shown in FIG. 6, a procedure according to exemplary embodiments of the present invention comprises an operation of receiving (S61) service quality reporting configuration information, an operation of generating (S62) a service quality report based on said service quality reporting configuration information, an operation of deciding (S63) whether to transmit said service quality report dependent on service quality reporting resource limitation parameters, and an operation of transmitting (S64) said service quality report based on a result of said deciding (S63).

Figure 4:
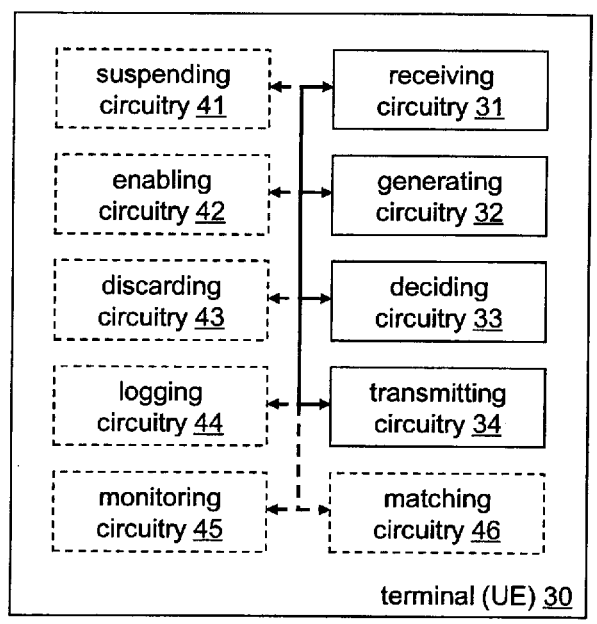
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise suspending circuitry 41, enabling circuitry 42, discarding circuitry 43, logging circuitry 44, monitoring circuitry 45, and/or matching circuitry 46.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 6, exemplary details of the deciding operation (S63) are given, which are inherently independent from each other as such.

Such exemplary deciding operation (S63) according to exemplary embodiments of the present invention may comprise an operation of receiving a suspend command to suspend service quality reporting issued based on said service quality reporting resource limitation parameters, and an operation of suspending to transmit said service quality report based on said suspend command.

According to further exemplary embodiments of the present invention, said suspend command comprises a suspension expiration timer, and exemplary additional operations are given, which are inherently independent from each other as such. According to such variation, an exemplary method according to exemplary embodiments of the present invention may comprise an operation of enabling to transmit said service quality report, if said suspension expiration timer is expired from the receiving of said suspend command.

According to a variation of the procedure shown in FIG. 6, exemplary additional operations are given, which are inherently independent from each other as such. According to such variation, an exemplary method according to exemplary embodiments of the present invention may comprise an operation of discarding said service quality report generated before said suspension expiration timer is expired from the receiving of said suspend command.

According to a variation of the procedure shown in FIG. 6, exemplary additional operations are given, which are inherently independent from each other as such. According to such variation, an exemplary method according to exemplary embodiments of the present invention may comprise an operation of logging said service quality report generated before said suspension expiration timer is expired from the receiving of said suspend command.

According to a variation of the procedure shown in FIG. 6, exemplary additional operations are given, which are inherently independent from each other as such. According to such variation, an exemplary method according to exemplary embodiments of the present invention may comprise an operation of receiving a recovery command to recover service quality reporting issued based on said service quality reporting resource limitation parameters, and an operation of enabling to transmit said service quality report based on said recovery command.

According to a variation of the procedure shown in FIG. 6, exemplary details of the deciding operation (S63) are given, which are inherently independent from each other as such.

Such exemplary deciding operation (S63) according to exemplary embodiments of the present invention may comprise an operation of receiving said service quality reporting resource limitation parameters, an operation of monitoring resources utilized for service quality reporting, and an operation of matching said resources utilized for service quality reporting with said service quality reporting resource limitation parameters.

According to further exemplary embodiments of the present invention (i.e. a variation of the procedure shown in FIG. 6), said suspend command comprises a suspension expiration timer said service quality reporting resource limitation parameters comprise a report number threshold, a monitoring time, and a suspension expiration timer, and exemplary details of the deciding operation (S63) are given, which are inherently independent from each other as such.

Such exemplary deciding operation (S63) according to exemplary embodiments of the present invention may comprise an operation of suspending, if during said monitoring time a service quality reporting number exceeds said report number threshold, to transmit said service quality report.

According to a variation of the procedure shown in FIG. 6, exemplary additional operations are given, which are inherently independent from each other as such. According to such variation, an exemplary method according to exemplary embodiments of the present invention may comprise an operation of enabling to transmit said service quality report, if said suspension expiration timer is expired from the suspending to transmit said measurement report.

Figure 8:
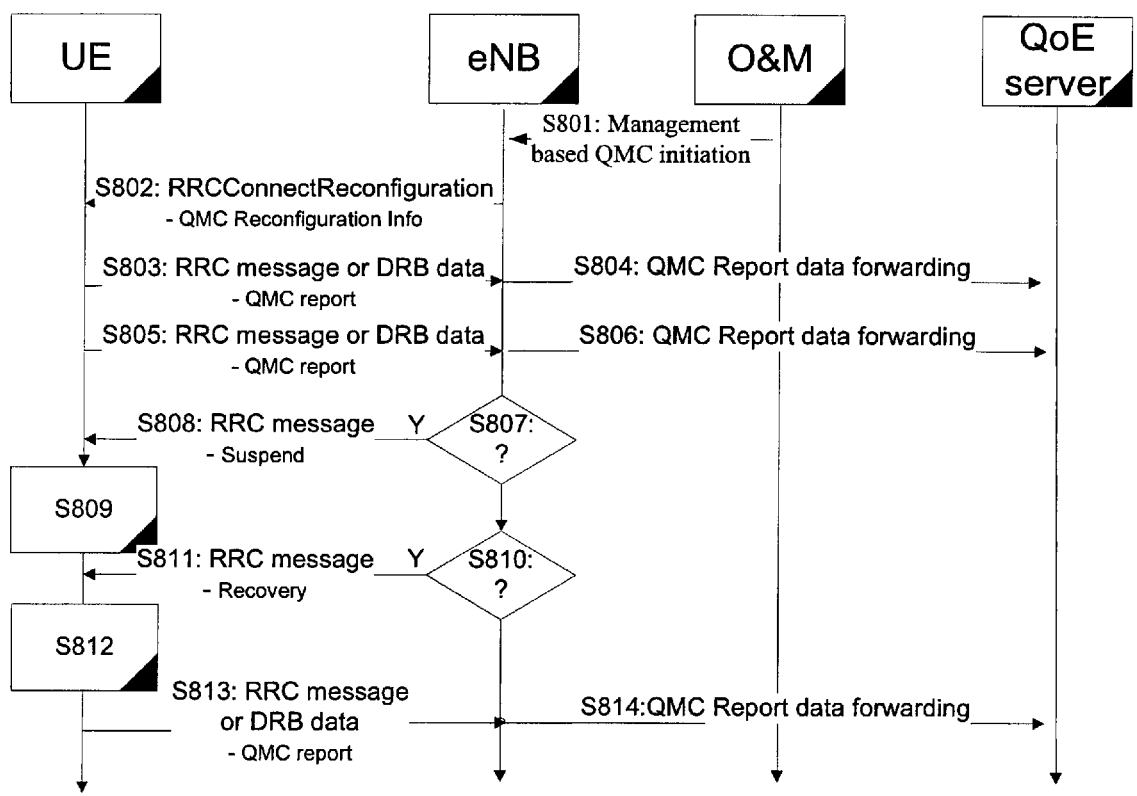
FIG. 8 shows a schematic diagram of signaling sequences according to exemplary embodiments of the present invention.
Figure 9:
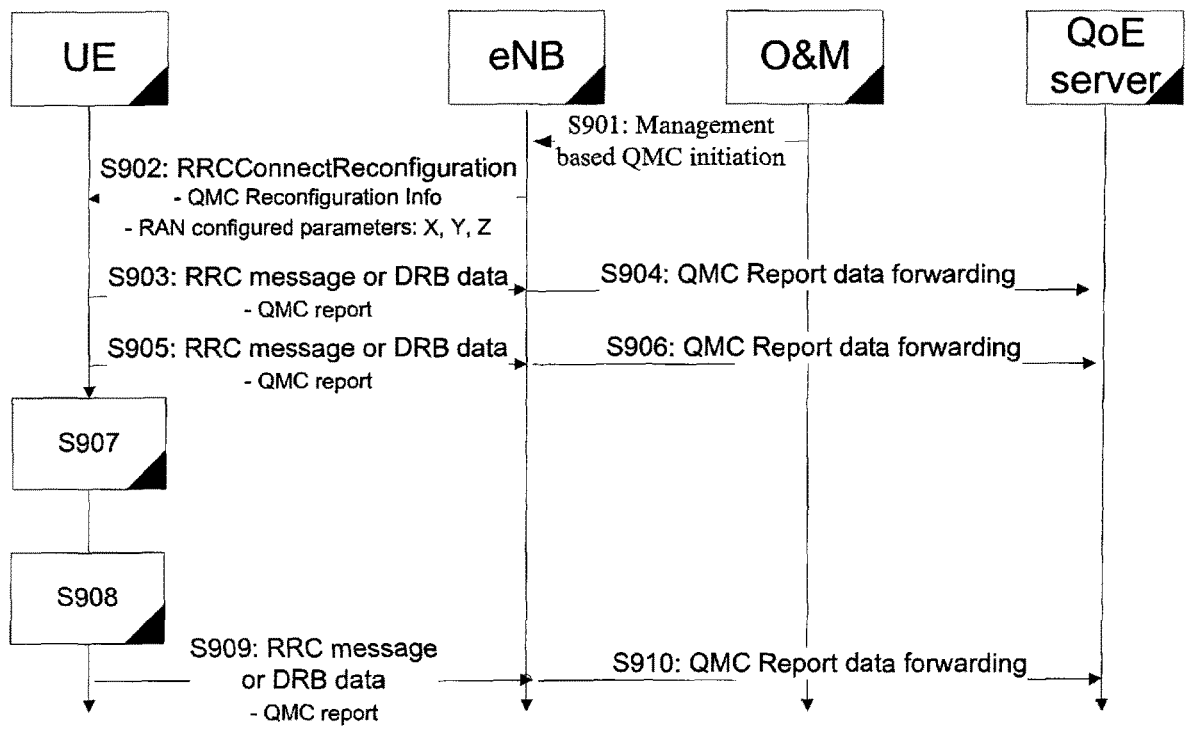
FIG. 9 shows a schematic diagram of signaling sequences according to exemplary embodiments of the present invention.

Exemplary embodiments of the present invention are explained in more specific terms with reference to FIGS. 8 and 9.

FIG. 8 shows a schematic diagram of signaling sequences according to exemplary embodiments of the present invention, and in particular shows exemplary but non-limiting implementation details of exemplary embodiments of the present invention, according to which the RAN network entity may control the QMC reporting frequency.

As shown in FIG. 9, in step S801, the O&M transmits a management based QMC initiation to the eNB. In step S802, the eNB transmits an RRCConnectReconfiguration including QMC Reconfiguration Information to the UE.

In step S803, the UE transmits an RRC message or DRB data including a QMC report to the eNB. In step S804, the eNB performs a corresponding QMC Report data forwarding to the QoE server.

In step S805, the UE transmits another RRC message or DRB data including a QMC report to the eNB. In step S806, the eNB performs a corresponding QMC Report data forwarding to the QoE server.

In step S807, if eNB detects that the number of reports is above X in time Y and that cell load is higher than W1 (Y in step S807), in step S808, the eNB transmits an RRC message including a Suspend command to the UE. In step S809, based thereon, the UE stops QMC reporting.

In step S810, if eNB detects that the cell load is lower than W2, (Y in step S810), in step S811, the eNB transmits an RRC message including a Recovery command to the UE. In step S812, based thereon, the UE re-starts QMC reporting.

Thus, in step S813, the UE transmits another RRC message or DRB data including a QMC report to the eNB. In step S814, the eNB performs a corresponding QMC Report data forwarding to the QoE server.

According to such exemplary embodiments, the QMC reporting may be fully and flexibly controlled by the network including reporting suspension and recovery.

FIG. 9 shows a schematic diagram of signaling sequences according to exemplary embodiments of the present invention, an in particular shows exemplary but non-limiting implementation details of exemplary embodiments of the present invention, according to which the RAN network entity may configure the UE and the UE may self-control (based on the configuration by the RAN network) the QMC reporting frequency.

As shown in FIG. 9, in step S901, the O&M transmits a management based QMC initiation to the eNB. In step S902, the eNB transmits an RRCConnectReconfiguration including QMC Reconfiguration Information and including RAN configured parameters X, Y and Z to the UE.

In step S903, the UE transmits an RRC message or DRB data including a QMC report to the eNB. In step S904, the eNB performs a corresponding QMC Report data forwarding to the QoE server.

In step S905, the UE transmits another RRC message or DRB data including a QMC report to the eNB. In step S906, the eNB performs a corresponding QMC Report data forwarding to the QoE server.

In step S907, if the UE detects that the report number is above X in time Y, the UE stops QMC reporting and starts the timer Z.

In step S908, after the timer Z has expired, the UE re-starts the QMC reporting.

Thus, in step S909, the UE transmits another RRC message or DRB data including a QMC report to the eNB. In step S910, the eNB performs a corresponding QMC Report data forwarding to the QoE server.

Such exemplary embodiments are simply implemented by the UE, and only less signaling exchanging (compared to embodiments according to which the RAN network entity may control the QMC reporting frequency) is needed. Compare with the embodiments according to which the RAN network entity may control the QMC reporting frequency, the present exemplary embodiments provide less flexibility to control reporting, since there is a possibility that even after suspending timer Z has expired, the overload situation may not be changed. The UE would nevertheless restart the QMC reporting.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 10:
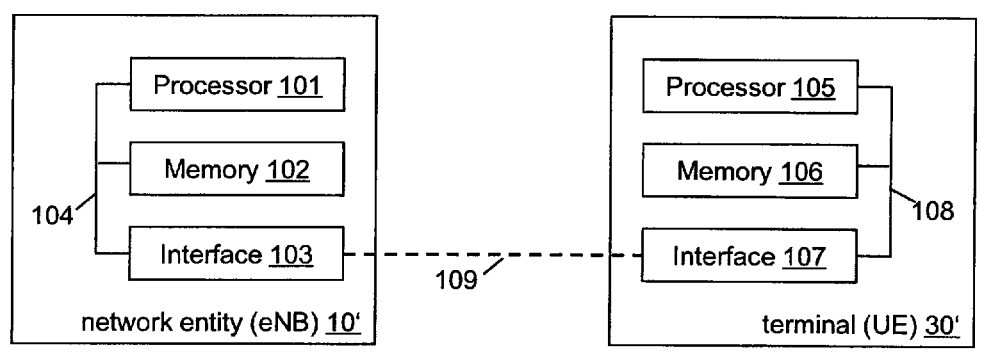
FIG. 10 is a block diagram alternatively illustrating apparatuses according to exemplary embodiments of the present invention.

In FIG. 10, an alternative illustration of apparatuses according to exemplary embodiments of the present invention is depicted. As indicated in FIG. 10, according to exemplary embodiments of the present invention, the apparatus (network entity) 10' (corresponding to the network entity 10) comprises a processor 101, a memory 102 and an interface 103, which are connected by a bus 104 or the like. Further, according to exemplary embodiments of the present invention, the apparatus (terminal) 30' (corresponding to the terminal 30) comprises a processor 105, a memory 106 and an interface 107, which are connected by a bus 108 or the like, and the apparatuses may be connected via link 109, respectively.

The processor 101/105 and/or the interface 103/107 may also include a modem or the like to facilitate communication over a (hardwire or wireless) link, respectively. The interface 103/107 may include a suitable transceiver coupled to one or more antennas or communication means for (hardwire or wireless) communications with the linked or connected device(s), respectively. The interface 103/107 is generally configured to communicate with at least one other apparatus, i.e. the interface thereof.

The memory 102/106 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network entity 10 comprises at least one processor 101, at least one memory 102 including computer program code, and at least one interface 103 configured for communication with at least another apparatus. The processor (i.e. the at least one processor 101, with the at least one memory 102 and the computer program code) is configured to perform receiving service quality reporting configuration information (thus the apparatus comprising corresponding means for receiving), to perform generating service quality reporting resource limitation parameters (thus the apparatus comprising corresponding means for generating), to perform forwarding said service quality reporting configuration information (thus the apparatus comprising corresponding means for forwarding), and to perform deploying said service quality reporting resource limitation parameters (thus the apparatus comprising corresponding means for deploying).

According to further exemplary embodiments of the present invention, an apparatus representing the terminal 30 comprises at least one processor 105, at least one memory 106 including computer program code, and at least one interface 107 configured for communication with at least another apparatus. The processor (i.e. the at least one processor 105, with the at least one memory 106 and the computer program code) is configured to perform receiving service quality reporting configuration information (thus the apparatus comprising corresponding means for receiving), to perform generating a service quality report based on said service quality reporting configuration information (thus the apparatus comprising corresponding means for generating), to perform deciding whether to transmit said service quality report dependent on service quality reporting resource limitation parameters (thus the apparatus comprising corresponding means for deciding), and to perform transmitting said service quality report based on a result of said deciding (thus the apparatus comprising corresponding means for transmitting).

For further details regarding the operability/functionality of the individual apparatuses, reference is made to the above description in connection with any one of FIGS. 1 to 9, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for enhancement of quality of experience measurement collection reporting. Such measures exemplarily comprise receiving service quality reporting configuration information, generating service quality reporting resource limitation parameters, forwarding said service quality reporting configuration information, and deploying said service quality reporting resource limitation parameters.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

List of Acronyms and Abbreviations
AS Access Stratum
CN Core Network
CP Control Plane
DRB (user) Data Radio Bearer
eNB evolved Node-B
E-UTRAN Evolved Universal Terrestrial Radio Access Network
gNB NR Node-B
LTE Long Term Evolution
NR New Radio
O&M Operation and Maintenance
RAN Radio Access Network
RNC Radio Network Controller
RRC Radio Resource Control
QMC QoE Measurement Collection
QoE Quality of Experience
UE User Equipment
UP User Plane
UTRAN Universal Terrestrial Radio Access Network

What is claimed is:

1. An apparatus comprising:
at least one processor,
at least one memory including computer program code, and
at least one interface configured for communication with at least another apparatus,
the at least one processor, with the at least one memory and the computer program code, being configured to cause the apparatus to:
receive quality of experience measurement reporting configuration information,
generate service quality reporting resource limitation parameters,
forward said quality of experience measurement reporting configuration information, and
deploy said service quality reporting resource limitation parameters.

2. The apparatus according to claim 1, wherein:
in relation to said deploying, the at least one processor, with the at least one memory and the computer program code, being further configured to cause the apparatus to:
monitor resources utilized for quality of experience measurement reporting, and
decide whether to limit said resources utilized for service quality of experience measurement reporting based on said service quality reporting resource limitation parameters.

3. The apparatus according to claim 2, wherein:
the at least one processor, with the at least one memory and the computer program code, being further configured to cause the apparatus to:
send, if said resources utilized for quality of experience measurement reporting are to be limited as a result of said deciding, a suspend command to suspend quality of experience measurement reporting.

4. The apparatus according to claim 3, wherein:
the at least one processor, with the at least one memory and the computer program code, being further configured to cause the apparatus to:
report suspension of said quality of experience measurement reporting.

5. The apparatus according to claim 3, wherein:
said quality of experience measurement reporting resource limitation parameters comprise a suspension expiration timer, and
said suspend command comprises said suspension expiration timer.

6. The apparatus according to claim 2, wherein:
the at least one processor, with the at least one memory and the computer program code, being further configured to cause the apparatus to:
send, if said resources utilized for quality of experience measurement reporting are not to be limited as a result of said deciding, a recovery command to recover quality of experience measurement reporting.

7. The apparatus according to claim 6, wherein:
the at least one processor, with the at least one memory and the computer program code, being further configured to cause the apparatus to:
report recovery of suspension of said quality of experience measurement reporting.

8. The apparatus according to claim 2, wherein:
said service quality reporting resource limitation parameters comprise a report number threshold, a monitoring time, and a cell load threshold, and
if, during said monitoring time, a quality of experience measurement reporting number exceeds said report number threshold and a cell load exceeds said cell load threshold, said resources utilized for quality of experience measurement reporting are to be limited as a result of said deciding.

9. The apparatus according to claim 8, wherein:
said quality of experience measurement reporting resource limitation parameters comprise a cell load recovery threshold, and
if, said cell load is lower than said cell load recovery threshold, said resources utilized for quality of experience measurement reporting are not to be limited as a result of said deciding.

10. The apparatus according to claim 2, wherein:
said quality of experience measurement reporting resource limitation parameters comprise a report number threshold, a monitoring time, and a communication endpoint load threshold, and
if, during said monitoring time, a quality of experience measurement reporting number exceeds said report number threshold and a communication endpoint load exceeds said communication endpoint load threshold, said resources utilized for service quality of experience measurement reporting are to be limited as a result of said deciding.

11. The apparatus according to claim 10, wherein:
said service quality of experience measurement reporting resource limitation parameters comprise a communication endpoint load recovery threshold, and
if, said communication endpoint load is lower than said communication endpoint load recovery threshold, said resources utilized for quality of experience measurement reporting are not to be limited as a result of said deciding.

12. The apparatus according to claim 1, wherein:
in relation to said deploying, the at least one processor, with the at least one memory and the computer program code, being further configured to cause the apparatus to:
transmit said quality of experience measurement reporting resource limitation parameters.

13. The apparatus according to claim 12, wherein:
said quality of experience measurement reporting resource limitation parameters comprise a report number threshold, a monitoring time, and a suspension expiration timer.

14. The apparatus according to claim 1, wherein:
the at least one processor, with the at least one memory and the computer program code, being further configured to cause the apparatus to:
receive a quality of experience measurement report, and
forward said quality of experience measurement report.

15. An apparatus comprising:
at least one processor,
at least one memory including computer program code, and
at least one interface configured for communication with at least another apparatus,
the at least one processor, with the at least one memory and the computer program code, being configured to cause the apparatus to:
receive quality of experience measurement reporting configuration information,
generate a quality of experience measurement report based on said quality of experience measurement reporting configuration information,
decide whether to transmit said quality of experience measurement report dependent on quality of experience measurement reporting resource limitation parameters, and
transmit said quality of experience measurement report based on a result of said deciding.

16. The apparatus according to claim 15, wherein:
in relation to said deciding, the at least one processor, with the at least one memory and the computer program code, being further configured to cause the apparatus to:
receive a suspend command to suspend quality of experience measurement reporting issued based on said quality of experience measurement reporting resource limitation parameters, and
suspend to transmit said quality of experience measurement report based on said suspend command.

17. The apparatus according to claim 16, wherein:
said suspend command comprises a suspension expiration timer, and
the at least one processor, with the at least one memory and the computer program code, being further configured to cause the apparatus to:
enable the apparatus to transmit said quality of experience measurement report, if said suspension expiration timer is expired from the receiving of said suspend command.

18. The apparatus according to claim 17, wherein:
the at least one processor, with the at least one memory and the computer program code, being further configured to cause the apparatus to perform at least one of the following:
discard said quality of experience measurement report generated before said suspension expiration timer is expired from the receiving of said suspend command, or
log said quality of experience measurement report generated before said suspension expiration timer is expired from the receiving of said suspend command.

19. The apparatus according to claim 16, wherein:
the at least one processor, with the at least one memory and the computer program code, being further configured to cause the apparatus to:
receive a recovery command to recover quality of experience measurement reporting issued based on said quality of experience measurement reporting resource limitation parameters, and
enable the apparatus to transmit said quality of experience measurement report based on said recovery command.

20. The apparatus according to claim 15, wherein:
in relation to said deciding, the at least one processor, with the at least one memory and the computer program code, being further configured to cause the apparatus to:
receive said quality of experience measurement reporting resource limitation parameters,
monitor resources utilized for quality of experience measurement reporting, and
match said resources utilized for quality of experience measurement reporting with said quality of experience measurement reporting resource limitation parameters.

21. The apparatus according to claim 20, wherein:
said quality of experience measurement reporting resource limitation parameters comprise a report number threshold, a monitoring time, and a suspension expiration timer, and
in relation to said deciding, the at least one processor, with the at least one memory and the computer program code, being further configured to cause the apparatus to:
suspend, if during said monitoring time a quality of experience measurement reporting number exceeds said report number threshold, to transmit said quality of experience measurement report.

22. The apparatus according to claim 21, wherein:
the at least one processor, with the at least one memory and the computer program code, being further configured to cause the apparatus to:
enable the apparatus to transmit said quality of experience measurement report, if said suspension expiration timer is expired from the suspending to transmit said measurement report.

* * * * *